United States Patent [19]

Wisbey

[11] Patent Number: 4,869,774
[45] Date of Patent: Sep. 26, 1989

[54] COMPLIANT PRESSER MEMBER FOR FIBER PLACEMENT MACHINE

[75] Inventor: Jerry D. Wisbey, Cincinnati, Ohio

[73] Assignee: Cincinnati Milacron Inc., Cincinnati, Ohio

[21] Appl. No.: 248,695

[22] Filed: Sep. 26, 1988

[51] Int. Cl.[4] .................. B32B 31/20; B32B 31/04
[52] U.S. Cl. .................... 156/523; 29/113.2; 100/93 RP; 156/486; 156/574; 156/582
[58] Field of Search .......... 156/574, 523, 486, 583.91, 156/582; 29/113.2; 100/93 RP, 211

[56] References Cited

U.S. PATENT DOCUMENTS 4,052,246 10/1977 Albareda et al. .................. 156/412
4,351,688 9/1982 Weiss et al. .
4,601,775 7/1986 Grone .

OTHER PUBLICATIONS

Fiber Placement Process Study by Don O. Evans, Milo M. Vaniglia and Paul C. Hopkins, Published in SAMPE 34th Symposium Book of Processing, May 8-11, 1989.

*Primary Examiner*—Michael W. Ball
*Assistant Examiner*—Jeff H. Aftergut
*Attorney, Agent, or Firm*—Thomas N. Farrell

[57] ABSTRACT

A bracket carries a plurality of wafer members stacked across the width of a fiber band. At least one wafer member is stationary with respect to the bracket, and at least one wafer member is movable, in a direction normal to the fiber laydown surface. In-line apertures are provided through the wafer members, and a fluid operated bladder is commonly disposed through the apertures and inflated to bias the movable wafer members against the fiber laydown surface when the stationary member is impressed against the fiber laydown surface. The wafer members have a compliant contact surface for contacting the band of fibers, and the movable wafer and contact means may thereby float with respect to the bracket to adapt to contour variances across the band width on the laydown surface.

4 Claims, 9 Drawing Sheets

COMPLIANT PRESSER MEMBER FOR FIBER PLACEMENT MACHINE

BACKGROUND OF THE INVENTION

The invention relates to fiber placement machines which employ multiple strands or tows of fiber which are pulled from a creel assembly and placed on a surface or workpiece. The invention will also find utility in machines for laying fiber-reinforced composite tape.

Fiber placement machines may be employed to place tows of fiber on flat, curved, or compound contours. Prior art assemblies include presser members of compaction and debulking of fibrous structures, the presser members including rollers and sliding shoes.

It is the object of the invention to provide a compact design for a presser member which is compliant to adapt to changing contours across the presser member face.

SUMMARY OF THE INVENTION

The invention is shown embodied in a presser member used in a fiber placement machine, where a fiber placement head is operable to cause the presser member to press a band of fibers against a work laydown surface. The improved presser member comprises: a bracket, carrier by a fiber placement machine member and having a reference axis running across the fiber band width; a plurality of wafer members carried by the bracket side-by-side across the reference axis, including at least one movable wafer, i.e., movable with respect to the reference axis, and at least one stationary wafer, i.e. stationary with respect to the reference axis; contact means located on the wafer members for contacting the band of fibers; aperture means provided through the wafer members; fluid operated spring means located in the aperture means for biasing the movable wafer and contact means against the band of fibers when the stationary wafer and contact means are impressed against the band of fibers by the bracket; wherein the movable wafer and contact means may float with respect to the reference axis to thereby adapt to contour variances across the band width on the laydown surface.

DESCRIPTION OF THE PREFERRED EMBODIMENT

The machine described in FIGS. 1-4 is the subject of a copending application, Ser. No. 248,702, filed Sept. 26, 1988, entitled Multi-Tow Fiber Placement Machine With Full Band Width Clamp, Cut, and Restart Capability, the disclosure of which is incorporated herein by reference.

Figure 1:
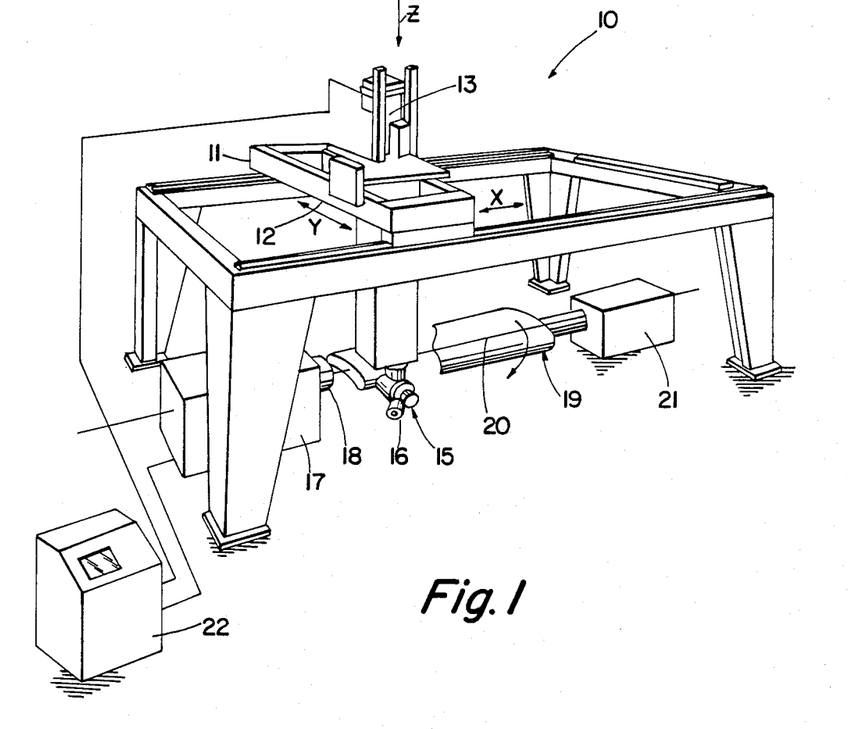
FIG. 1 is a perspective view of a fiber placement machine.

FIG. 1 shows a gantry machine or robot 10 having an elevated way system suitable for carrying a carriage 11 and cross-slide 12 in X and Y directions, in a plane parallel to the floor. The cross-slide 12 supports a saddle 13 for vertical movement, and the saddle 13 has a forearm 14 which contains a drive mechanism (not shown) for actuating a wrist 15 supported at the end of the forearm 14. The forearm 14 and wrist 15 are manufactured substantially as the serial roll wrist depicted in the U.S. Pat. No. 4,068,536, assigned to Cincinnati Milacron Inc., the assignee of the present invention. The gantry robot 10 depicted in FIG. 1 is commercially available from Cincinnati Milacron Inc., under the Model No. T3-886 gantry series industrial robot, and other similar mechanisms will suffice. As described in the aforementioned U.S. patent, the wrist 15 has the capability of moving a tooling plate 16 in three degrees of rotary motion, and a desired tool assembly, or end effector (not shown), is affixed to the tooling plate 16. It will be appreciated that other wrists, for example, the roll-bend-roll variety of manipulators, may be employed.

A variety of work may be positioned on the floor within the range of the tooling plate 16. The work may be flat or curved; rotating or stationary.

A servo-controlled mandrel unit 17 is shown, having a rotary spindle 18 for positioning an exemplary workpiece, such as an air foil form 19. The mandrel unit 17 is, in effect, a headstock capable of supporting, driving, and positioning work about a reference axis 20, here shown horizontally.

Here it should be noted that a variety of mandrel units and auxiliary footstocks 21 may be suitable for positioning work.

A computer numerical control (CNC) 22 is employed to control the multi-degree-of-freedom spatial positioning of the tooling plate 16 and selected and effector. The CNC 22 also controls the work position about the reference axis 20. One such control is commercially-available under the trademark ACRAMATIC—Model 975-C CNC, from Cincinnati Milacron Inc.

Figure 2:
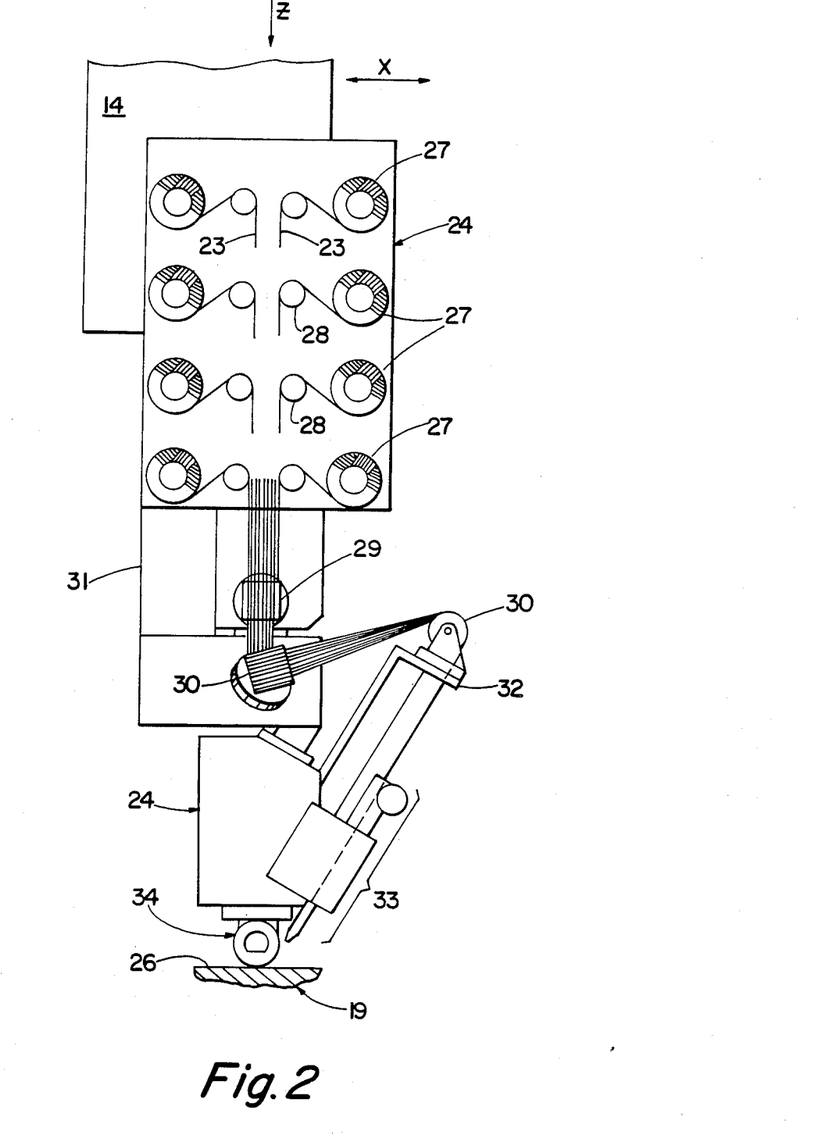
FIG. 2 is an elevational view showing the vertical forearm of the fiber placement machine of FIG. 1 supporting a fiber placement head.

With reference to FIGS. 1 and 2, the machine 10 is arranged to place long and short lengths of fiber tows 23 on the air foil form 19 in an operation similar to filament winding, but where the tows may extend along concave, or undercut, surfaces.

FIG. 2 schematically depicts the vertical forearm 14 of FIG. 1 with a creel assembly 24 mounted thereto. A fiber placement head 25 is affixed to the wrist tooling plate 16 and is wieldable to approach the workpiece surface 26, it being appreciated by those skilled in the art that the surface may be curved as well as flat, and the surface 26 may move with respect to the fiber placement head 25 and vice-versa. The creel assembly 24 and fiber placement head 25 are thus movable on a common forearm 14 and the wrist 15 provides relative movement between the placement head 25 and the creel assembly 24. The creel assembly 24 is depicted schematically as having eight spools 27 of fiber tows 23, each tow 23 pulled from a spool 27 and trained over a respective tension maintaining roller 28, in a manner known in the art. The eight tows 23 depicted are guided around a grooved roller 29 affixed to the forearm 14, and are then trained around a pair of redirect rollers 30 carried on a creel bracket 31 and an outboard support bracket 29 of the placement head 25. Note: the roller 30 is actually an assembly of discrete, independently rotatable, single-groove roller segments, the details of which do not form part of the present invention. The redirect rollers 30 are mounted in bearings so that they may swivel and thus be automatically oriented in accordance with tension of the fiber tows 23. The tows 23 are brought through a clamp, cut and restart unit ("CCR" unit) 33 and are finally brought around a presser member assembly 34 where they are impressed on the work surface 26.

The details of the CCR unit 33 do not form part of the present invention, but are the subject of the aforementioned copending application.

Figure 3:
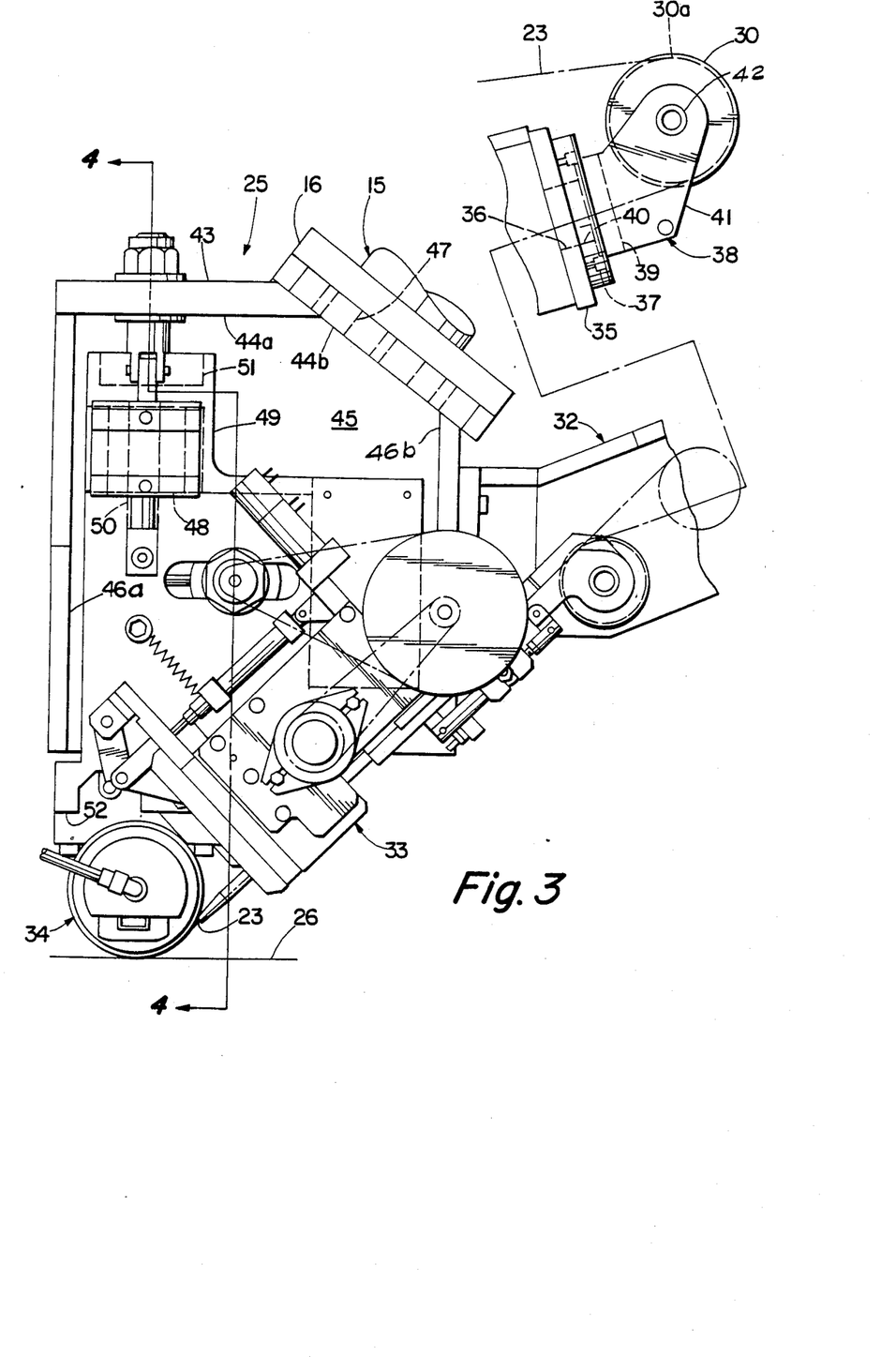
FIG. 3 is a close-up elevational view of the fiber placement head of FIG. 2.

Referring now to FIG. 3, the fiber placement head 25 is shown in more detail, affixed to the tooling plate 16 of the wrist 15. The topmost end of the outboard support bracket 32 of the placement head 25 is fabricated of a plate 35 having a through clearance hole 36, and the plate 35 supports an antifriction bearing 37 which carries the redirect roller assembly 38. The assembly 38 is fabricated from a plate 39, having a through clearance hole 40, and welded parallel side plates 41. The parallel plates 41 captivate the redirect roller 30 which is freely journalled on a tubular support shaft 42 extending through the side plates 41. The fiber tows 23 are depicted parallel to one another, extending around grooves 30a in the roller 30, and passed down through the open outboard bracket 32 to the CCR unit 33.

Figure 4:
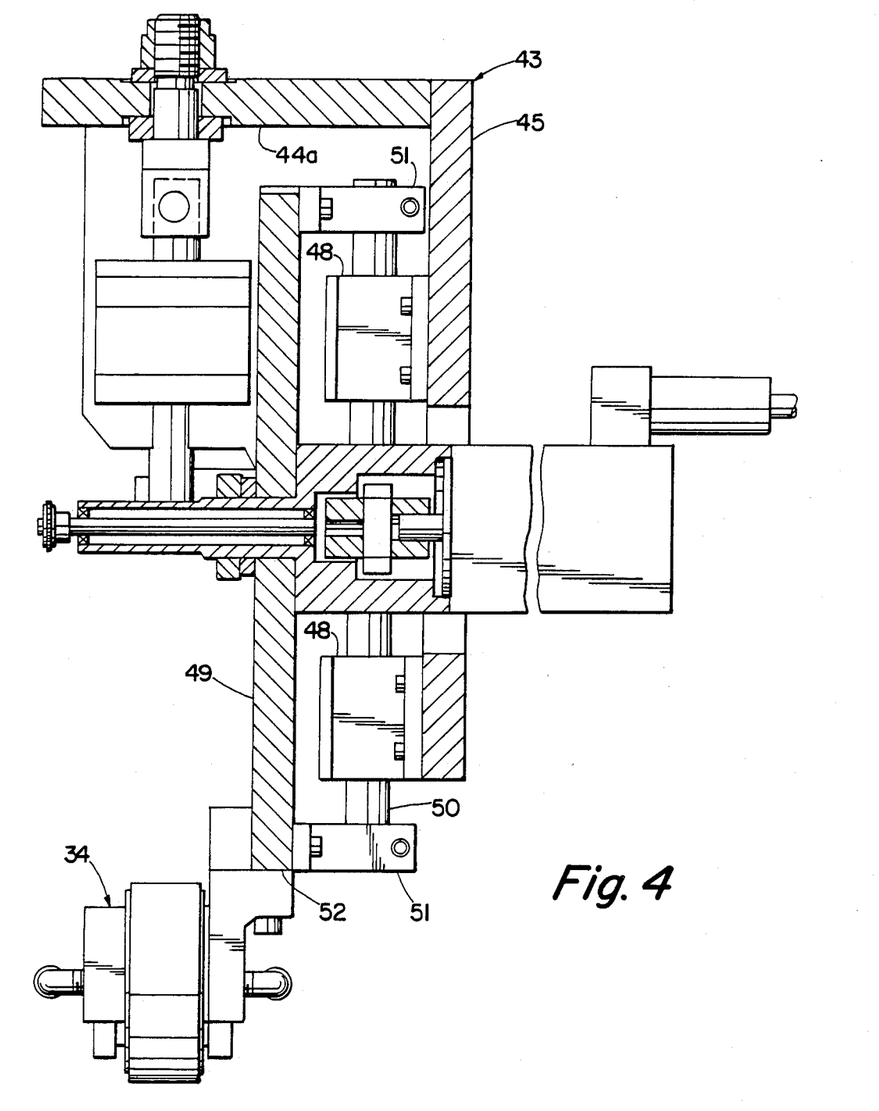
FIG. 4 is a side elevational view taken along the line 4—4 of FIG. 3.

The main bracket 43 of the placement head 25, see FIGS. 3 and 4, is comprised of a fabrication, having a horizontal top plate 44a, angled top corner plate 44b, and a vertical back plate 45, welded with side gussets 46a,b. A pilot bore 47 is provided through the top corner plate 44b for registration on the wrist tooling plate 16. Three vertically-oriented ball bushings 48 are affixed to the vertical plate 45 of the main bracket 43, for guiding a vertical slide 49. The slide 49 has a pair of precision bars 50a,b, affixed to the rear by suitable support blocks 51, the bars 50a,b being free to ride vertically in the ball bushings 48. The slide 49 is configured as a notched plate, having uniform thickness, and the lowermost slide edge 52 carries the presser member assembly 34, which will be described further in connection with FIGS. 5-9.

Presser Member Assembly

Figure 5:
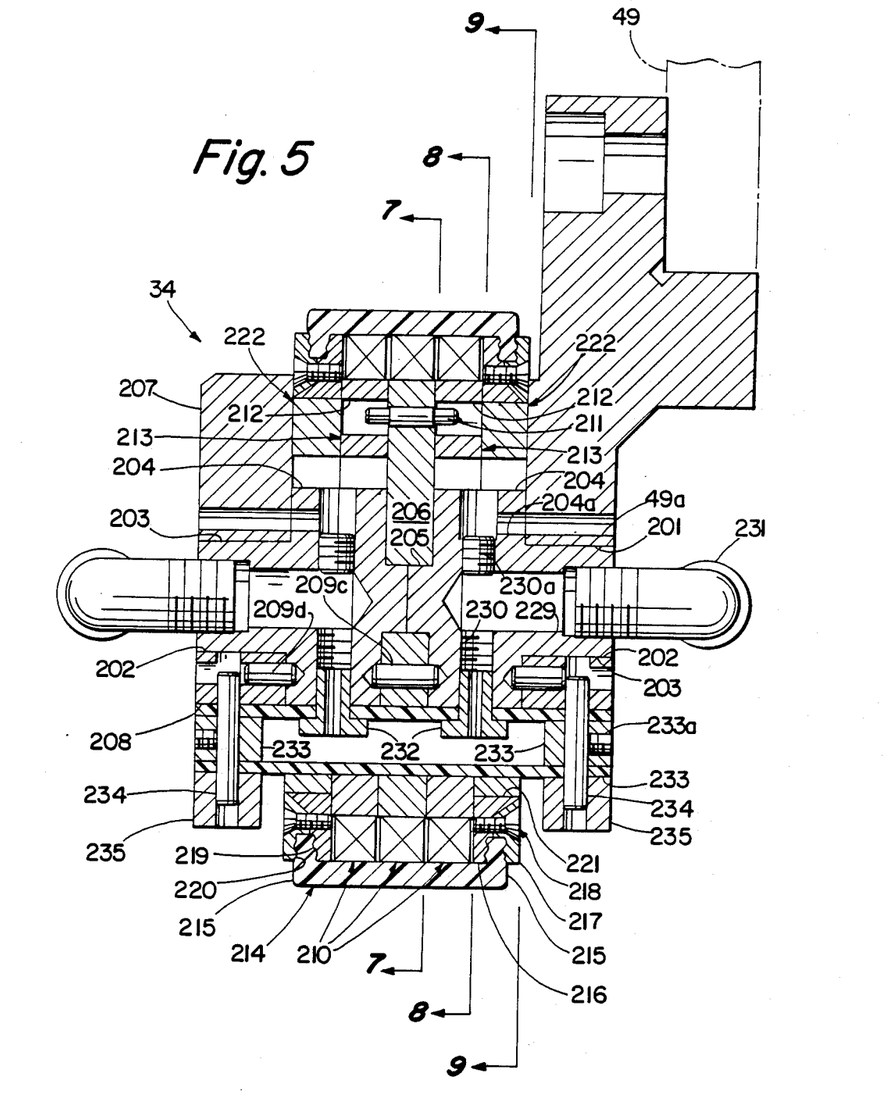
FIG. 5 is a section through the axis of the presser member assembly of FIG. 3.
Figure 6:
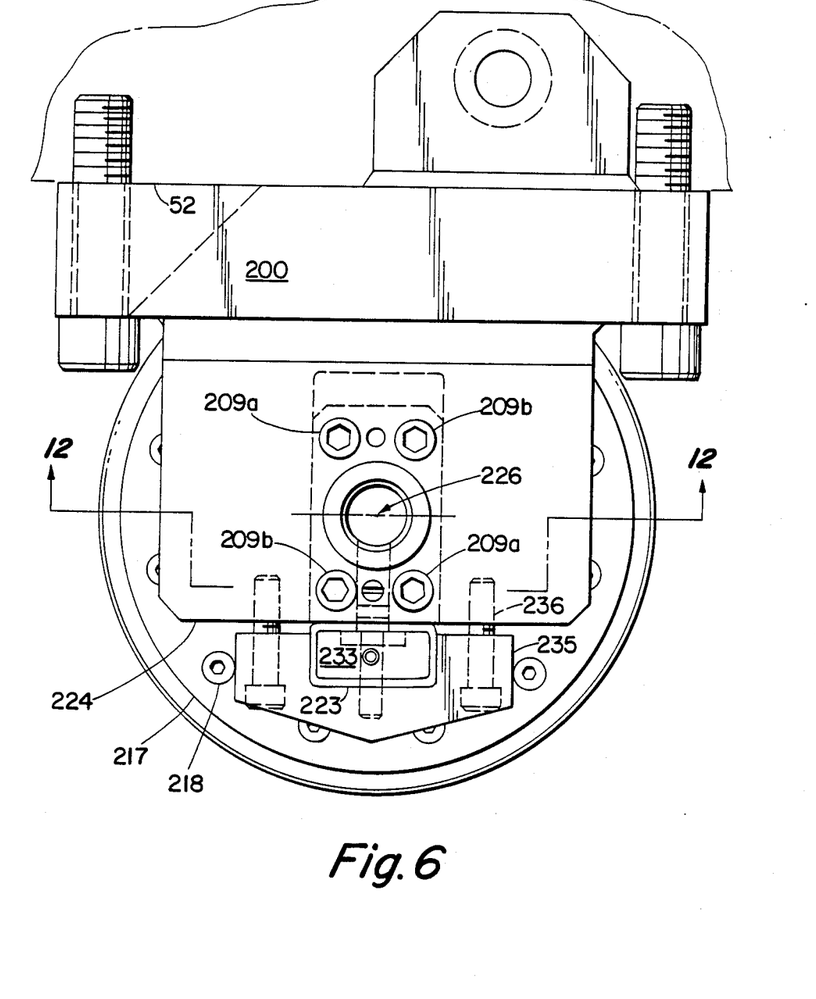
FIG. 6 is a side profile view of the presser member assembly.
Figure 12:
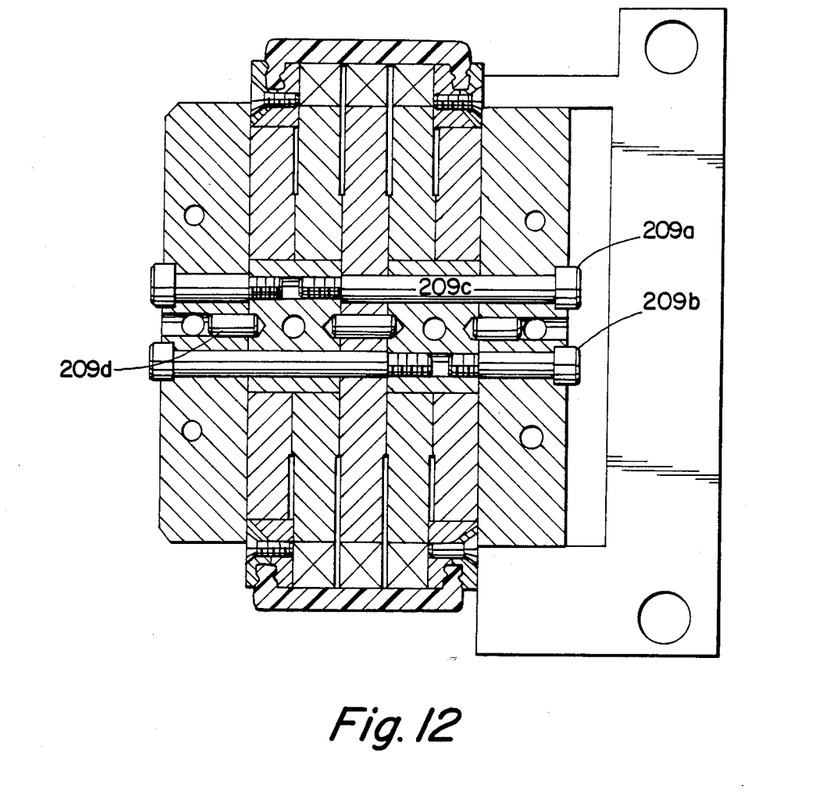
FIG. 12 is a sectional view through the presser member, taken along the line 12—12 of FIG. 6.

Referring now to FIGS. 5 and 6, the presser member assembly 34 is shown cantilevered off the lower surface 52 of the vertical slide 49. An angle bracket 200, extending downwardly from the plate 49, has a horizontal bore 201 which carries a support shaft 202. The support shaft 202 has a main diameter 203, received in the bore 201, and has a rectangular head 204 oriented with its long dimension vertical, with a short pilot 205 extending from the head 204. A thin central disc 206 is received on the pilot 205 and a second, identical, support shaft 202 is inserted from the opposite side of the disc 206. The main diameter 203 of the second support shaft 202 receives a generally-cylindrical outboard retainer block 207 having a chordal bottom surface 208, and the pieces are pulled together in unitary assembly by upper and lower sets of long and short cap screws 209a,b and aligned by pins 209c,d, in the manner shown in FIG. 12. In essence, therefore, the unit forms a stable axle having side guides. A central ball bearing 210 is received on the central disc 206, and a stroke-limiting pin 211 extends from the sides of the disc 206, near the top. The pin extends into vertically-controlled slots 212 machined through a pair of matching intermediate discs 213 which are adjacent to the central disc 206. A pair of ball bearings 210, identical to the central ball bearing 210, are received on the intermediate discs 213. A flexible tubular elastomeric tube, or sleeve 214, having annular end lips 215, is received over the three bearings 210, ad is captivated at each of its opposite end lips 215 by a clamp ring assembly having inner and outer rings 216,217 facially secured to one another by countersunk cap screws 218. The rings 216,217 have annular ridges 219,220 to retain the distortable sleeve 214. Each inner ring 216 has a central bore 221 having a smooth running fit with an end disc 222. A closed-end elastomeric air tube 223, of rectangular cross-section (see FIG. 6), extends across the bottom surfaces 224,208 of the angle bracket 200 and outboard retainer block 207, and the tube 223 extends through the central disc 206, intermediate discs 213, and end discs 222. The tube 223 forms a fluid-filled bladder, or biasing spring. The central disc 206 (see FIG. 7) is provided with a rectangular aperture 225, the exact shape of the tube 223, since the central disc 206 does not move with respect to the central axis 226 of the assembly. However, each intermediate disc 213 (see FIG. 8) has an elongated slot 227 closely-fitted to the sides of the shaft head 204, extending above the head 204 and around the elastomeric tube 223, since the disc 213 is designed to float in vertical directions. Similarly, each end disc 222 (see FIG. 9) is provided with an elongated vertical rectangular slot 228. When the sleeve 214 is against a surface, parallel to the axis 226 across its width, the intermediate and end discs 213,222 are biased to a position centered with the central disc 206, by the elastomeric tube 223. The support shaft 202 has a central pipe-threaded hole 229 extending to a cross-drilled and tapped hole 230, which interconnects with the elastomeric tube 223, and air fittings 231 (FIG. 5) conduct pressurized air to the tube 223. A pair of hollow, headed bushings 232 are inserted through the interior of the tube 223 and threadably received into the rectangular head 204 to securely clamp and seal the elastomeric tube 223 and provide an air flow passage. The upper ends of the tapped holes 230 are plugged with threaded plugs 230a, and the area above the plugs 230a is relieved of threads and connected to side vent holes 204a and 49a. The ends of the tube 223 are closed by snug-fitting rectangular blocks 233 (see FIG. 6) so the tube 223 will maintain its rectangular shape, and the blocks 233 are captivated by pins 234 received in the angle bracket 200 and retainer block 207. A tapped hole 233a is to assist in pulling the block 233 out of the tube 234. A pair of clamps 235 are received around the tube 223 and end blocks 233 and held, respectively, to the angle bracket 200 and outboard retainer block 207 by a pair of cap screws 236.

The intermediate and end discs 213,222 have their widths dimensioned to a smooth, sliding fit with respect to the support shaft head 204.

Therefore, as varying slopes and curvatures are encountered across the sleeve 214, the intermediate discs and their respective bearings 210 will float radially, along with the end discs 222, under the bias force provided by the tube 223, to enable the sleeve 214 to conform to the shape of the surface 26.

Figure 10:
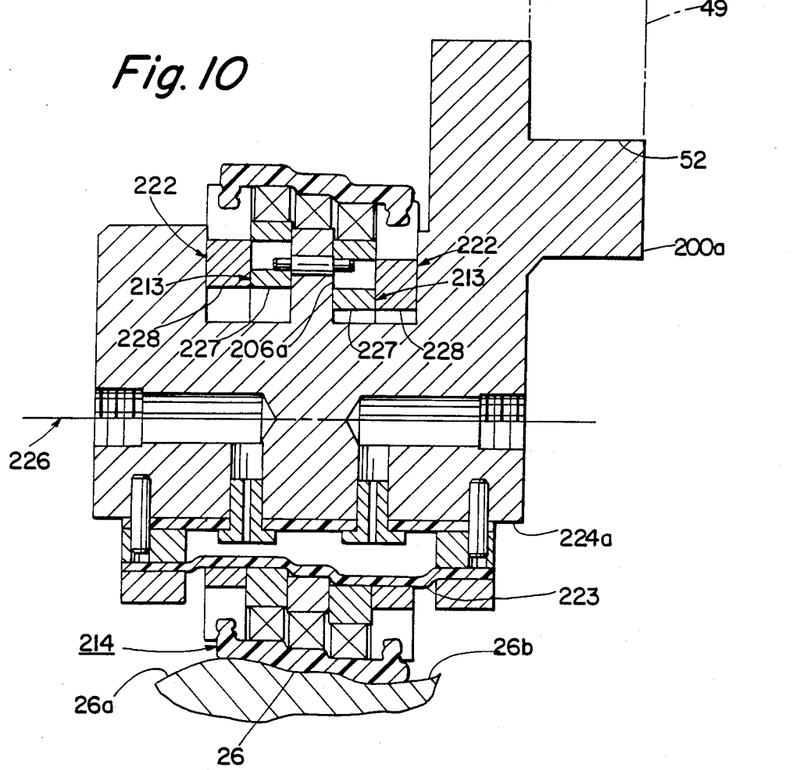
FIG. 10 is a diagrammatic view of the presser member elements of FIG. 5.

FIG. 10 depicts the presser member elements of FIG. 5 in diagrammatic form, illustrating a one-piece angle bracket 200a and showing the flexible sleeve 214 adapted to a work laydown surface 26, thus forming a datum for the reference axis 226. To the left center, a surface portion 26a rises, and to the right of center a surface portion 26b lowers with respect to the datum surface 26. The central disc portion 206a is shown integrally fixed to the angle bracket 200a. The bottom surface 224a of the angle bracket 200a, facing the work laydown surface 26, extends through the intermediate and end discs 213,222, and also through the central disc portion 206a, the surface 224a forming a convenient reference, or backup, surface for the urethane tube 223.

The bracket surface 224a forms an expansible chamber within each of the apertures 227,228 of the intermediate and end discs 213,222. The pressurized tube 23 acts as an inflated bladder spring to bias the discs 213,222 towards the work laydown surface 26.

Alternate Embodiment

Figure 11:
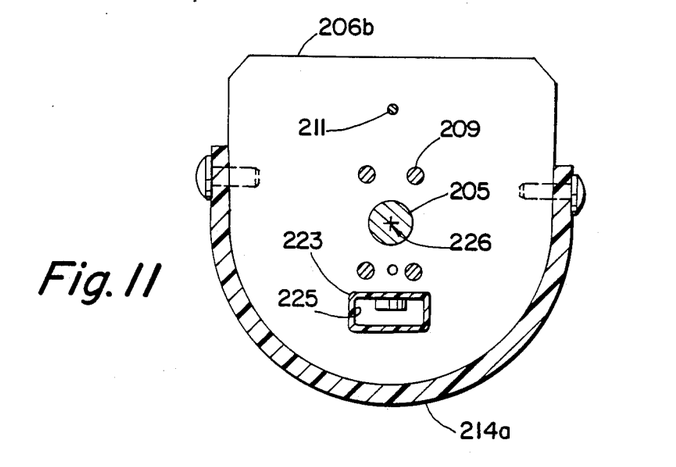
FIG. 11 is an alternate embodiment of the presser member, without rotating elements, taken at the same location as FIG. 7.

In certain applications, it may be desired that the presser member be a skid, or shoe, rubbing on the fibers at the laydown point. In such case, the principles illustrated in FIGS. 5 and 10 would still be applicable to obtain compliance with surface contours, but the antifriction bearings 210 would be removed, and the non-rotating wafer-like discs 206,213,222 could be used, or any convenient shape substituted; for example, the wafer-like shoe 206b with a flexible sheet 214a formed around the bottom and affixed to the assembly as shown in FIG. 11.

It should be appreciated by those skilled in the art, that the wafer-like segments, or discs 206,213,222, may be varied as to quantity and dimension, to achieve a wide range of segmented compactor assemblies.

It should also be appreciated by those skilled in the art that composite fiber tape may, in some instances, be substituted for the fiber tows and the invention may thereby be used to press composite fiber tape supplied from a tape reel.

While the invention has been shown in connection with a preferred embodiment, it is not intended that the invention be so limited; rather, the invention extends to all such designs and modifications as come within the scope of the appended claims.

What is claimed is:

1. In a fiber placement machine, having a band of fibers oriented with its length relatively running along a path with respect to a fiber laydown surface, the band length being relatively long when compared to its bandwidth, and wherein the machine employs a fiber presser member to press the band of fibers against the laydown surface, an improved presser member, comprising:
   a bracket, affixable to a fiber placement machine member, and having a reference axis substantially parallel to the fiber bandwidth;
   a plurality of wafer members carried by said bracket in serial disposition across the reference axis, at least one of said wafer members beiing a movable wafer, movable with respect to said reference axis, and at least one of said wafer members being a stationary wafer, stationary with respect to said reference axis;
   contact means on said wafer members for contacting the band of fibers;
   aperture means through said wafer members; and
   fluid operated spring means in said aperture means for biasing said movable wafer and contact means against said band of fibers when said stationary wafer and contact means are impressed against said band of fibers by said bracket,
   wherein said movable wafer and contact means may float with respect to said reference axis to adapt to contour variance across said bandwidth on said laydown surface.

2. The presser member of claim 1, wherein said contact means is flexible and common across said wafer members.

3. The presser member of claim 1, wherein said fluid operated spring means comprises an expansible fluid bladder extending commonly through said aperture means.

4. In a fiber placement machine, having a band of fibers oriented with its length relatively running along a path with respect to a fiber laydown surface, the band length being relatively long when compared to its bandwidth, and wherein the machine employs a fiber presser member to press the band of fibers against the laydown surface, an improved presser member, comprising:
   a bracket, including means for affixing said bracket to a fiber placement machine member;
   a plurality of wafer members carried by said bracket, and serially-disposed along the fiber bandwidth, each wafer member having a through aperture, substantially in line with the next adjacent wafer member, and including at least one movable wafer member and one stationary wafer member;
   a stationary bracket reference surface extending through said wafer member apertures;
   an expansible chamber formed within said movable wafer members, between said bracket reference surface and a cooperatingly-opposed aperture surface; and
   an expansible, fluid-operated bladder commonly extending through said wafer member apertures, and including means for communicating with a source of fluid pressure,
   wherein said bladder is operable, under influence of internal fluid pressure, to bias said movable wafer member toward said work laydown surface, with respect to said bracket.

* * * * *

UNITED STATES PATENT AND TRADEMARK OFFICE
CERTIFICATE OF CORRECTION

PATENT NO. : 4,869,774
DATED : September 26, 1989
INVENTOR(S) : Jerry D. Wisbey

It is certified that error appears in the above–identified patent and that said Letters Patent is hereby corrected as shown below:

<u>In the Drawings</u>

Figures 7, 8, 9:
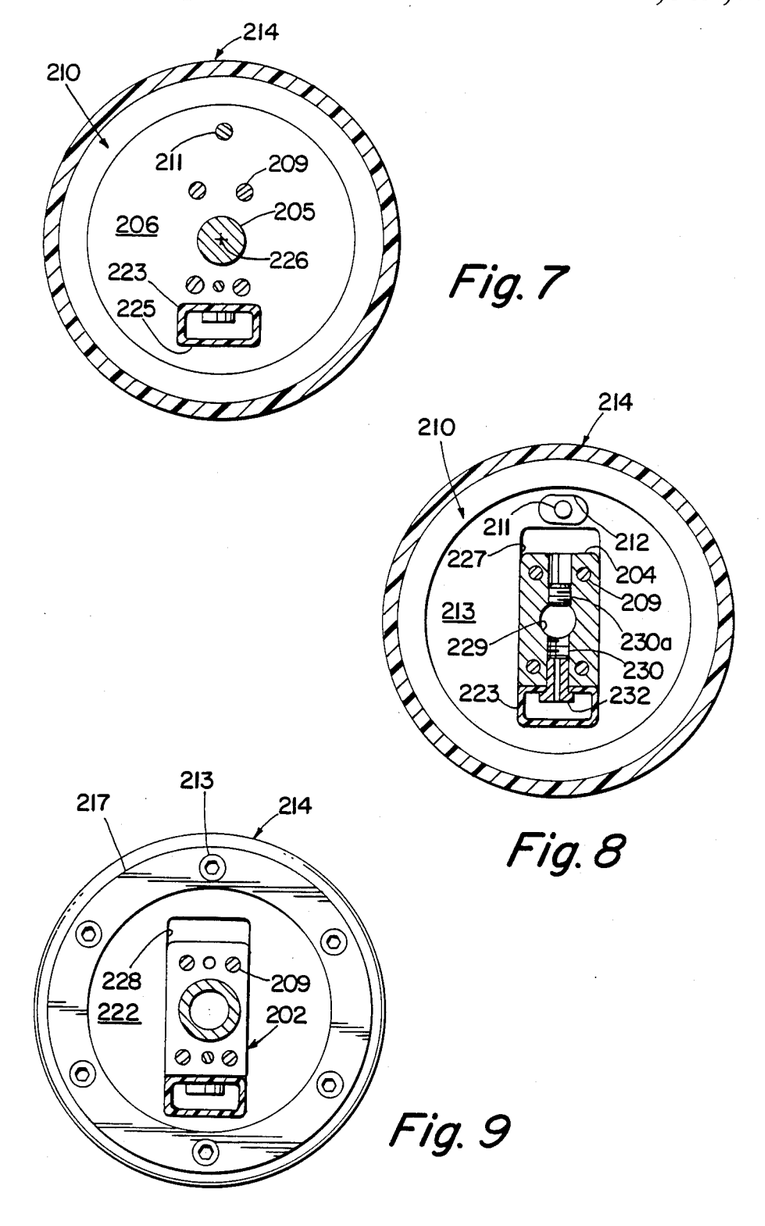
FIG. 7 is a side elevational section taken along the line 7—7 of FIG. 5.
FIG. 8 is a side elevational section taken along the line 8—8 of FIG. 5.
FIG. 9 is a side elevational section taken along the line 9—9 of FIG. 5.

In Fig. 2, the lowermost occurrence of "24" should read -- 25 --.
In Fig. 5, the rightmost occurrence of "233" should read -- 223 --.
In Fig. 9, "213" should read -- 218 --.

At column 3, line 11, "29" should read -- 32 --.
At column 3, lines 49 and 50, "50a,b" should read -- 50 --.
At column 4, line 61, "234" should read -- 223 --.
At column 5, line 23, "23" should read -- 223 --.

Signed and Sealed this

Sixth Day of September, 1994

Attest:

BRUCE LEHMAN

*Attesting Officer*  *Commissioner of Patents and Trademarks*